No. 637,727. Patented Nov. 21, 1899.
G. P. GASTON.
ACETYLENE GAS GENERATOR.
(Application filed Feb. 8, 1899.)
(No Model.)
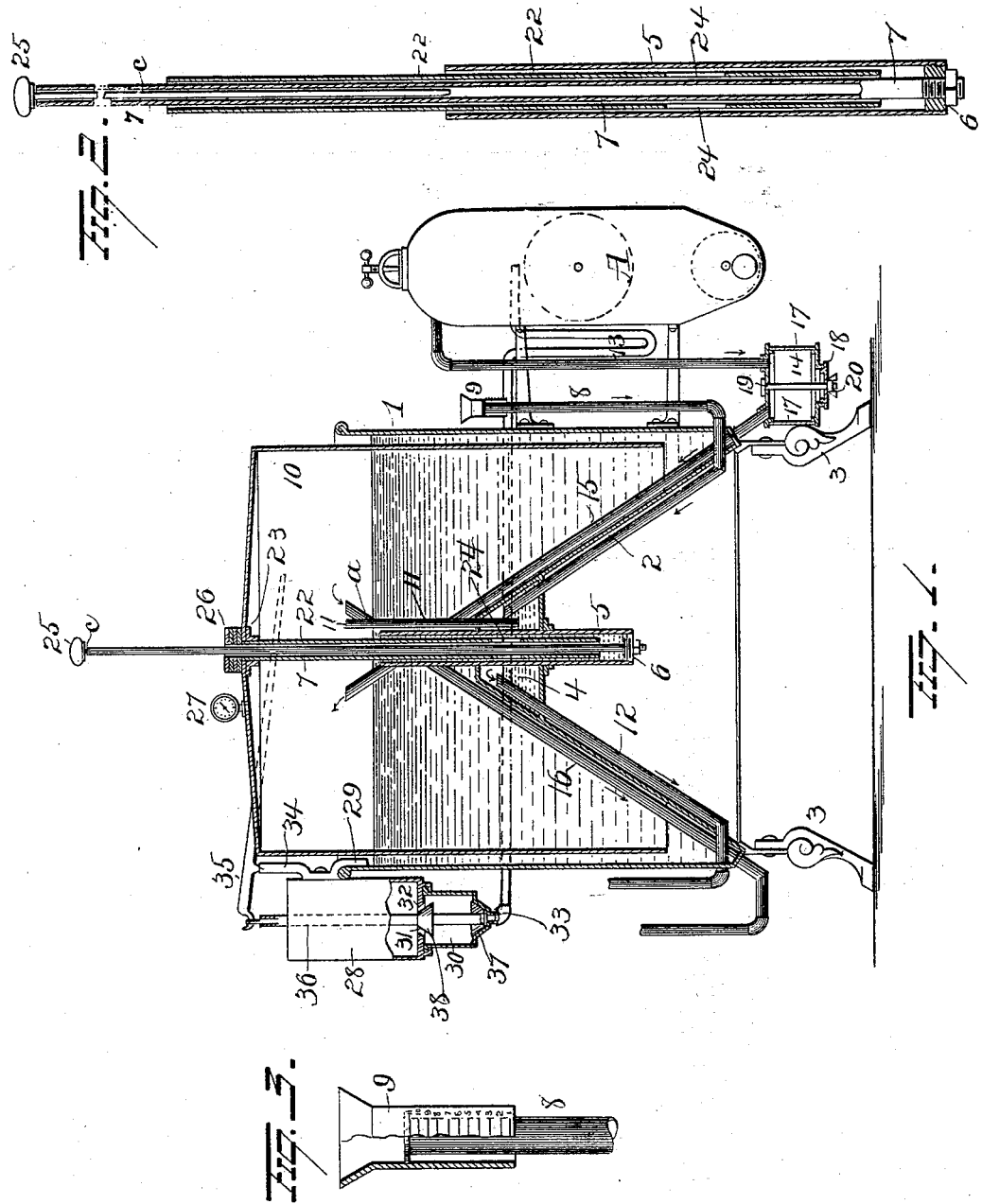
WITNESSES
INVENTOR
G. P. Gaston
By H. A. Seymour
Attorney

UNITED STATES PATENT OFFICE.

GEORGE P. GASTON, OF SILVER CREEK, NEW YORK.

ACETYLENE-GAS GENERATOR.

SPECIFICATION forming part of Letters Patent No. 637,727, dated November 21, 1899.

Application filed February 8, 1899. Serial No. 704,973. (No model.)

*To all whom it may concern:*

Be it known that I, GEORGE P. GASTON, a resident of Silver Creek, in the county of Chautauqua and State of New York, have invented certain new and useful improvements in Gas Apparatus; and I do hereby declare the following to be a full, clear, and exact description of the invention, such as will enable others skilled in the art to which it appertains to make and use the same.

My invention relates to an improvement in acetylene-gas apparatus, the object of the invention being to provide a gas apparatus which will be automatic in its action and free from danger when in use.

A further object is to provide a reservoir for a gas apparatus which will greatly economize the use of water.

A further object is to provide a reservoir for a gas apparatus with a conical bottom having an exhaust-chamber at its top adapted to contain water to a desired level.

A further object is to provide a tank for supplying water to the generator which will be automatically operated by the float or bell of the reservoir to cause a predetermined amount of water to flow to the generator.

A further object is to provide a gas apparatus which will be simple in construction, comparatively cheap to manufacture, and most effectual when in use.

With these objects in view the invention consists in certain novel features of construction and combinations and arrangements of parts, as will be more fully hereinafter described, and pointed out in the claims.

In the accompanying drawings, Figure 1 is a view in section illustrating my improvements, and Figs. 2 and 3 are views of details.

1 represents a tank having an upwardly-extending conical bottom 2 and suitable legs or supports 3, as shown. The conical bottom 2 is provided on its upper end with a conical receptacle 4, entirely closed. A vertical tube or pipe 5 passes entirely through said receptacle 4 and projects upwardly any desired distance, where it is open, as shown at *a*, and projects down below the receptacle 4, where it is closed by a suitable plug 6.

A water-supply pipe 8 extends from a point about midway the outside of the tank 1 downward to the base of the conical bottom, and then through the tank and up into the receptacle 4, and terminates a proper distance from the bottom of said receptacle, or, in other words, at the desired water-level, as shown in Fig. 1. The outer end of the supply-pipe 8 is provided with a telescoping gage 9, which will at all times denote the water-level in the receptacle and at the same time act as an auxiliary or telescoping section of said supply-pipe should a greater amount of water be desired in the receptacle 4.

Water is placed in the tank 1 and a bell or float 10 is placed therein, leaving a space between the top of the bell and the water-level for the reception of gas. An exhaust-pipe 11 communicates with the bell 10 above the water-line therein and projects downward into the receptacle 4, terminating below the water-line therein, whereby to permit the escape of gas from the bell should same become excessive, and the water in the receptacle 4 will act as a seal and give sufficient resistance to the gas to prevent its constant flow therein. The resistance of the flow of gas can be regulated by increasing or diminishing the amount of water in the receptacle, as it will be seen that the greater the body of water the gas is compelled to penetrate the greater the resistance to the passage of the gas. A pipe 12 communicates with the interior of the receptacle 4 at a point above the water-line thereof and is adapted to convey the exhausted gas to a point outside of the building or to an auxiliary reservoir, as may be desired.

Gas is conveyed to the reservoir by a pipe 13, which communicates with any approved gas-generator A and projects downward into a sediment and condensing chamber 14. A pipe 15 projects upward from said sediment-chamber 14 and communicates with the interior of the bell at a point above the water-line thereof. A pipe 16 communicates with the interior of the bell and extends downward and outward and is adapted to convey the gas from the reservoir to any desired point for burning.

The sediment and condensing chamber 14 above referred to is preferably provided with transparent sections 17, whereby to enable the operator to see at all times the amount of sediment therein and effect its removal before accident can occur, as is the case so frequently with the devices now in use. A suitable door or shutter 18 may be provided for cleaning said sediment-chamber, and said door or shutter is adapted to be closed and held in place by a suitable bolt 19 and thumb-nut 20, as shown in Fig. 1.

The tube 5 heretofore mentioned is disposed slightly below the water-level in the tank, and hence is constantly filled with water.

An opening is provided centrally in the top of the bell 10, and a tube or pipe 22 is connected to the under face of said bell and communicates with said opening therein and is secured in place by a suitable ring 23. The tube or pipe 22 projects downward into the tube 5 a suitable distance below the water and is provided near its lower end with slots or openings 24, whereby when the bell becomes so full of gas that it will rise to a sufficient height to permit the slots or openings 24 in the tube 22 to pass above the water-line the gas will pass into said pipe and escape through the top of the bell. A tube 7 is secured to the plug 6 in the bottom of the tube 5 and projects upward through the pipe or tube 22 out through the top of the bell any desired height, and a rod c is disposed in said tube 7 and provided on its upper end with a weight 25 to act as an extra weight automatically applied to the gas-holder or bell as the same rises and acts in the same capacity as a counterbalance on the safety-valves of a steam-boiler when the gas-holder or bell rises above the water in the tank, thus allowing the gas to escape into tube 22. This extra weight on rod c holds the gas-holder steady and at the same time allows the gas to escape until the counterweight overpowers the pressure of gas, so that the slots again fall below the water-level in the tank, and is only used as an extra precaution in case of an overpressure of gas and prevents explosion. Ordinarily the overpressure should escape through the receptacle 4. Suitable weights 26 are disposed around said tube 7 and on top of the bell, whereby to counterbalance the upward tendency of the bell and regulate the necessary gas-pressure. A gage 27 may also be provided on said bell to indicate the precise pressure of gas in the reservoir.

A tank 28, preferably cylindrical in form and having a hook or hooks 29 on its side to engage the side of the tank 1, is disposed on said tank 1 and is adapted to contain water to be supplied to the generator A, as will be more fully hereinafter described.

A receptacle 30 is disposed below the tank 28, and said tank 28 is provided with an opening 31, around which the bottom of the tank is beveled, as shown at 32, and the bottom of the receptacle 30 extends downward in conical form and communicates with a suitable pipe 33, which supplies water to the generator A. The tank 28 is provided on one side with an upwardly-projecting arm 34, on the upper end of which a lever 35 is fulcrumed between its ends. One end of the lever 35 is adapted to be engaged by the bell and to be operated thereby. The other end of the lever 35 is disposed centrally over the tank 28 and has secured to it a vertical hollow tube 36. This hollow tube is necessary to prevent a vacuum in the lower chamber when the tube is raised, so the upper stopper closes the bottom of the supply-tank, as will more fully hereinafter appear. The hollow tube referred to is for the purpose of allowing air to flow to the lower chamber. Otherwise the suction would form a vacuum and stop the flow of water out of the lower receptacle for the supply of water to the generator. The idea is to allow a given amount of water to flow when the lever is operating the lower stopper that is attached to the hollow tube at the time when the upper stopper is closed, thus furnishing the air to the lower chamber or receptacle. The hollow rod 36 projects downward through the opening 31 and is provided on its end with a conical-shaped stopper 37, adapted to fit snugly and seat in the conical bottom of the receptacle 30 when said hollow tube 36 is forced down. The tube 36 is provided between its ends with a larger stopper 38, beveled on its upper edge and adapted to fit snugly and seat in the opening 31 in the bottom of the tank 28 when said hollow tube is raised.

The operation of my improved water-supply tank is as follows: When a predetermined amount of gas is in the reservoir, the bell will be raised a sufficient height to permit the stopper 37 to remain tight against its seat, and hence shut off the supply of water to the generator. When the amount of gas in the reservoir diminishes, the bell will descend and the lever 35 will be operated to lift the hollow tube 36, force the stopper 38 against its seat, and open stopper 37, thus permitting the amount of water in the receptacle 30 to flow through the pipe 33 to the generator. Then the water which reaches the generator will generate more gas and the bell will rise, and the lever 35 will operate to close the stopper 37 and open the stopper 38, and hence shut off the supply of water to the generator and fill the receptacle 30.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A gas-reservoir comprising a tank having an upwardly-extending conical bottom, said bottom having an exhaust-chamber at its top and means for conveying gas from said tank to said receptacle or chamber and from said chamber outside of said tank, and mounted on suitable legs or supports.

2. In a gas-reservoir, the combination with a tank, of an upwardly-projecting conical bottom for said tank having a receptacle therein adapted to contain water, a pipe adapted to convey gas to a point in said receptacle below the water-level and a pipe adapted to convey gas from said receptacle, said last-mentioned pipe communicating with said receptacle above the water therein.

3. In a gas apparatus, the combination with a tank, of a receptacle in said tank closed on all sides and having a tube passing entirely therethrough, means connected with said receptacle for exhausting gas from said tank and means in said tube for exhausting gas from said tank.

4. In a gas apparatus the combination with a tank, of a receptacle in said tank closed on all sides and having a central standard tube passing entirely therethrough securely fastened at its lower end, a bell movable in said tank and having a central opening in its top, a tube communicating with said opening and disposed in said first-mentioned tube and having slots or openings normally submerged in water and adapted to permit the escape of gas through said tube when said bell is raised to a predetermined height, a standard tube disposed in said last-mentioned tube which is securely fastened at its lower end and extending out through the top of the bell a desired distance to guide said bell and prevent swaying of same, and a rod disposed in said last-mentioned tube or standard and having a weight at its upper end to counterbalance the upward pressure of gas when the bell reaches said weight and acts as a safety-valve thereto.

5. In a gas-reservoir, the combination with a tank adapted to contain water having an upwardly-projecting conical bottom and a bell adapted to float in the water in said tank, of a receptacle located at the top of said conical bottom and adapted to contain water, a tube or pipe adapted to convey water to said receptacle, said tube or pipe having a telescoping gage on its outer end to denote the water-line in said receptacle, a pipe or tube adapted to convey gas from the bell to a point below the water-line in said receptacle and another tube or pipe adapted to communicate with said receptacle above the water-line and convey any overpressure of gas outside of said tank into the open air outside of the building.

6. In a gas apparatus, the combination with a gas-generator and a reservoir, of a tank disposed in proximity to the reservoir and adapted to supply water to the generator, a receptacle below said tank and communicating therewith, a hollow tube or pipe passing through said tank and receptacle, a stopper on said tube at the bottom of said tank and another stopper on said tube or pipe at the bottom of said receptacle, and means for operating said hollow tube and stoppers thereon to permit a predetermined amount of water to flow to the generator.

7. In a gas apparatus, the combination with a generator and a reservoir therefor, of a water-tank removably connected to said reservoir and adapted to supply water to the generator a receptacle below said tank and communicating therewith, a pipe or tube connecting said receptacle and generator, a tube disposed in said tank and receptacle and having stoppers thereon, one of said stoppers adapted to close the opening connecting the tank and receptacle and the other stopper adapted to close the opening in the receptacle communicating with the pipe leading to the generator, and a lever on said tank attached at one end to the tube or pipe and adapted at the other end to be engaged by the movable bell of the reservoir whereby to open one of said stoppers and close the other.

8. In a gas apparatus, the combination with a generator and a reservoir therefor, of an exhaust-tube for said reservoir, a hollow tube in said exhaust-tube and an automatic overpressure-weight at the top of said last-mentioned tube.

In testimony whereof I have signed this specification in the presence of two subscribing witnesses.

GEORGE P. GASTON.

Witnesses:
C. G. BABCOCK,
GUY L. SMITH.